US010233824B2

United States Patent
Ge

(10) Patent No.: US 10,233,824 B2
(45) Date of Patent: Mar. 19, 2019

(54) IGNITION SYSTEM FOR ENGINE HAVING ADAPTIVELY CONTROLLED PRECHAMBER IGNITION DEVICE

(71) Applicant: Caterpillar Inc., Peoria, IL (US)

(72) Inventor: Xinyu Ge, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/606,827

(22) Filed: May 26, 2017

(65) Prior Publication Data

US 2018/0340464 A1 Nov. 29, 2018

(51) Int. Cl.
| | |
|---|---|
| F02M 7/00 | (2006.01) |
| F02B 19/12 | (2006.01) |
| F02B 19/10 | (2006.01) |
| G05B 13/02 | (2006.01) |
| F02M 51/06 | (2006.01) |

(52) U.S. Cl.
CPC .......... *F02B 19/12* (2013.01); *F02B 19/1052* (2013.01); *F02D 2200/06* (2013.01); *F02M 51/061* (2013.01); *G05B 13/021* (2013.01)

(58) Field of Classification Search
CPC ................. F02D 35/023; F02D 35/024; F02D 2200/0414; F02D 41/0245; F02D 41/0255
USPC ....... 123/435, 676, 457, 462–465, 479, 480, 123/511; 701/104, 105
See application file for complete search history.

(56) References Cited

U.S. PATENT DOCUMENTS

| | | | |
|---|---|---|---|
| 2015/0354476 A1* | 12/2015 | Ge | F02D 41/0002 60/274 |
| 2016/0178470 A1* | 6/2016 | Ge | F02M 25/0753 73/1.57 |
| 2017/0074224 A1 | 3/2017 | Ge | |

\* cited by examiner

*Primary Examiner* — John Kwon
(74) *Attorney, Agent, or Firm* — Mattingly Burke Cohen & Biederman

(57) ABSTRACT

An ignition system for an internal combustion engine includes a prechamber ignition device, a fuel admission valve for the prechamber ignition device, and a combustion consistency control mechanism configured to receive data indicative of at least one of a magnitude of a peak pressure in a combustion prechamber of the prechamber ignition device or a timing of the peak pressure in the combustion prechamber. The combustion consistency control mechanism calculates an error based on the data, and outputs a valve opening command to a fuel valve to produce a shot of combustion-initiating gases from the prechamber device, the valve opening command being based on the error.

22 Claims, 3 Drawing Sheets

IGNITION SYSTEM FOR ENGINE HAVING ADAPTIVELY CONTROLLED PRECHAMBER IGNITION DEVICE

TECHNICAL FIELD

The present disclosure relates generally to an engine ignition system having a prechamber ignition device, and more particularly to adaptively controlling a prechamber ignition device to improve combustion consistency.

BACKGROUND

Ignition systems and strategies for internal combustion engines have a variety of different known forms, depending upon the design of the engine, the fuel type and combustion charge composition, and the operating environment. Spark-ignited systems are well known and widely used, perhaps most familiar from the gasoline engines commonly used in automobiles. Compression ignition systems are typically used in diesel engines, also applied to mobile vehicles as well as many other applications, particularly those that are heavy duty. For spark-ignited engines, an electrical spark provides a localized, high temperature ignition point for fuel and air to produce a flame that subsequently propagates throughout the cylinder. Compression ignition involves increasing the temperature and pressure of a mixture of fuel and air to an autoignition threshold, which can produce multiple different autoignition points within the cylinder. In either case, the end result is ignition and combustion of a charge of fuel and air that causes a rapid increase in pressure and temperature within the cylinder to drive linear motion of a piston. Both traditional spark-ignited and compression ignition systems can have various advantages or disadvantages depending upon the environment of application.

Another type of ignition system, also known for many years but receiving increased implementation and development efforts relatively more recently, is known as a prechamber ignition system. A prechamber ignition system involves the combustion of a relatively small amount of fuel, in a combustion prechamber that is in fluid communication or fluidly connectable to a main combustion chamber or cylinder in an internal combustion engine. Ignition and combustion of the relatively small amount of fuel in the prechamber, which can be the same fuel or a different fuel from the fuel forming a main charge, produces jets of hot, actively combusting fuel and air that penetrate into the main combustion chamber to ignite the main charge of fuel and air therein.

Prechamber ignition devices can provide a relatively robust mechanism for ignition, and can be relatively precisely controlled. With the advent of increasingly stringent emissions requirements in certain jurisdictions, prechamber ignition devices have been applied for the purpose of igniting relatively lean mixtures of fuel and air, commonly a gaseous fuel such as natural gas, that are less readily ignited by other techniques. Lean operation can provide for relatively low amounts of certain emissions. United States Patent Application Publication No. 2017/0074224 to Ge sets forth one design for a fuel admission valve for a prechamber ignition device.

SUMMARY OF THE INVENTION

In one aspect, an ignition system for an internal combustion engine includes a prechamber ignition device defining a combustion prechamber, and a fuel admission valve adjustable from a closed state to an open state to admit fuel into the combustion prechamber, for producing a shot of combustion-initiating gases from the prechamber ignition device. The ignition system further includes a monitoring mechanism configured to produce data indicative of at least one of a magnitude of a peak pressure in the combustion prechamber or a timing of the peak pressure in the combustion prechamber. The ignition system further includes a combustion consistency control mechanism coupled with the fuel admission valve and with the monitoring mechanism. The combustion consistency control mechanism is configured to calculate an error that is based on the data indicative of at least one of a magnitude of a peak pressure or a timing of the peak pressure, and output a valve opening command for the fuel admission valve that produces a shot of combustion-initiating gases from the prechamber ignition device, the valve opening command being based on the error.

In another aspect, a method of reducing shot-to-shot variation among shots of combustion-initiating gases from a prechamber ignition device in an internal combustion engine includes producing a first shot of combustion-initiating gases from the prechamber ignition device into a cylinder in the internal combustion engine. The method further includes receiving data indicative of at least one of a magnitude of a peak pressure in a combustion prechamber of the prechamber ignition device or a timing of a peak pressure in the combustion prechamber, the peak pressure resulting from the production of the first shot of combustion-initiating gases. The method still further includes calculating an error based on the data indicative of at least one of a magnitude of the peak pressure or the timing of the peak pressure, and outputting a valve opening command for a fuel admission valve coupled with the prechamber ignition device that is based on the error. The method further includes producing a second shot of combustion-initiating gases from the prechamber ignition device into the cylinder in the internal combustion engine responsive to the valve opening command.

In still another aspect, an ignition control system for an internal combustion engine includes a monitoring mechanism configured to produce data indicative of at least one of a magnitude of a peak pressure in a combustion prechamber of a prechamber ignition device or a timing of the peak pressure in the combustion prechamber. The ignition control system further includes a combustion consistency control mechanism coupled with the monitoring mechanism. The combustion consistency control mechanism is configured to receive the data indicative of at least one of a magnitude of a peak pressure or a timing of the peak pressure, calculate an error based on the data indicative of at least one of a magnitude of a peak pressure or a timing of the peak pressure, and output a valve opening command to a fuel admission valve coupled with the prechamber ignition device such that the prechamber ignition device produces a shot of combustion-initiating gases, the valve opening command being based on the error.

DETAILED DESCRIPTION

Figure 1:
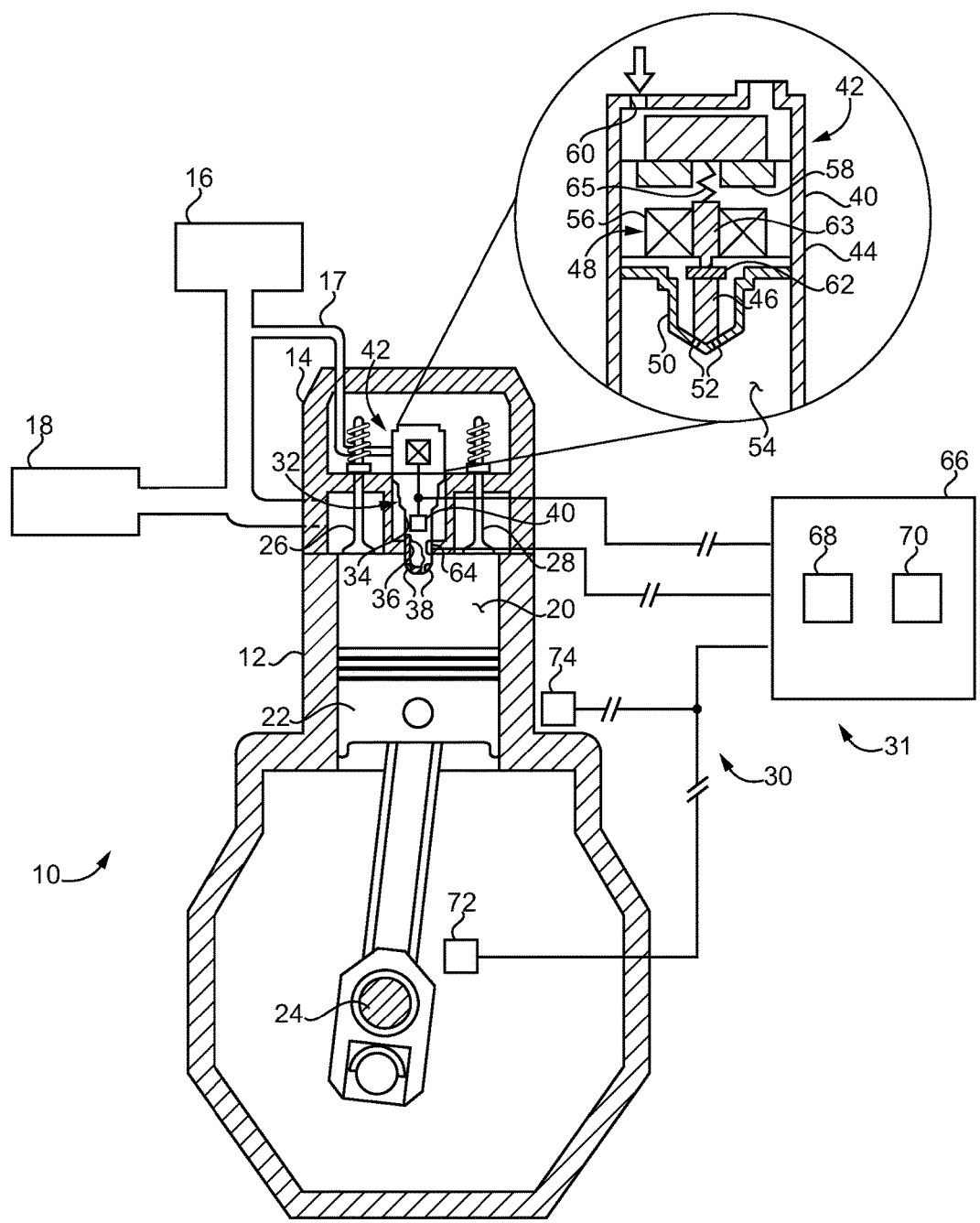
FIG. 1 is a partially sectioned side diagrammatic view, including a detailed enlargement, of an internal combustion engine, according to one embodiment.

Referring to FIG. 1, there is shown an internal combustion engine 10 according to one embodiment, and including a cylinder block 12 and an engine head 14 coupled with cylinder block 12. A cylinder 20 is formed in cylinder block 12, and may include one of a plurality of cylinders formed in cylinder block 12 although only one is visible in FIG. 1. A piston 22 is positioned to reciprocate within cylinder block 12 in a conventional manner between a top dead center position and a bottom dead center position in a four-stroke engine cycle. A crankshaft 24 is coupled with piston 22 and any other pistons of engine 10. In an implementation, engine 10 is prechamber-ignited, and can include a supply of a fuel 16, such as a gaseous fuel, and a supply of oxidant 18, typically air. Air and fuel can be conveyed from fuel supply 16 and oxidant supply 18 to engine head 14, and delivered into cylinder 20 by way of an intake valve 26. An exhaust valve 28 controls expelling exhaust from cylinder 20 to an exhaust system (not shown) of engine 10.

Engine 10 further includes an ignition system 30 having a prechamber ignition device 32 defining a combustion prechamber 36 within a prechamber ignition device housing 34. A plurality of holes or orifices 38 fluidly connect combustion prechamber 36 with cylinder 20. In the illustrated embodiment prechamber ignition device 32 is positioned within engine head 14 so as to extend into cylinder 20. A prechamber ignition device similar or identical to prechamber ignition device 32 as shown in FIG. 1 may be coupled with each of the plurality of engine cylinders which may be formed in cylinder block 12. A fuel line 17 extends from fuel supply 16 to provide a supply of fuel to prechamber ignition device 32. It can be noted that the fuel in the configuration shown in FIG. 1 is the same as the fuel that is provided to cylinder 20. In an implementation, the fuel may include natural gas, or any of a variety of other gaseous fuels such as propane, biogas, mine gas, landfill gas, mixtures of these, or still others. Equipment (not shown) may be provided for vaporizing the fuel from a liquid to a gas. Rather than employing the same gaseous fuel for prechamber ignition device 32 as is supplied to cylinder 20, a different fuel such as a different gaseous fuel, or a liquid fuel, could be used in prechamber ignition device 32. As will be further apparent from the following description, prechamber ignition device 32 and/or associated components may be adaptively controlled in a manner providing various improvements over traditional prechamber operating and control strategies.

Ignition system 30 may further include a fuel admission valve 42 that is coupled with or part of prechamber ignition device 32. Fuel admission valve 42 is adjustable from a closed state to an open state to admit fuel into combustion prechamber 36, for producing a shot of combustion-initiating gases from prechamber ignition device 32 into cylinder 20. Prechamber ignition device 32 may further be equipped with a spark mechanism 40, such as an internal spark plug, that is configured to produce a spark for igniting the mixture of fuel and air within combustion prechamber 36.

FIG. 1 also depicts additional details of fuel admission valve 42 in a detailed enlargement, including a valve housing 44, and a valve member 46 therein which is movable to adjust fuel admission valve 42 between the closed state and the open state. An electrical actuator 48 is also positioned at least partially within valve housing 44 and can be energized and de-energized in a manner further discussed herein to adjust valve member 46 so as to contact or not contact a valve seat 50. In the illustrated embodiment a plurality of holes or orifices 52 are formed in valve seat 50, and can be alternately blocked or opened by way of the movement of valve member 46. A fuel inlet 60 is also formed in valve housing 44, and supplies fuel into valve housing 44. Moving valve member 46 in the manner described herein enables fuel to be controllably supplied to prechamber ignition device 32 by way of a valve cavity 54. Those skilled in the art will appreciate a variety of other admission valve configurations that could be provided. In an implementation, a check valve (not shown) can be positioned fluidly between valve chamber 54 and prechamber ignition device 32.

Actuator 48 further includes a solenoid or solenoid coil 56 that can be energized, or otherwise varied in electrical energy state, to cause an armature 62 coupled with valve member 46 to move towards coil 56. Fuel admission valve 42 further includes a stop 58 that armature 62, or a connecting rod 63 coupled to armature 62, contacts at an upper limit of travel of valve member 46 and armature 62. A biasing spring 65 is compressed by connecting rod 63 as valve member 46 and armature 62 travel away from valve seat 50, and then provides a biasing force to return armature 62 and valve member 46 back towards the closed position blocking orifices 52.

Those skilled in the art will be familiar with the dynamic environment within which prechamber ignition devices such as prechamber ignition device 32 operate. There are various forces in the nature of fluid pressures, magnetic attraction or repulsion, spring forces, friction, and potentially still others that affect the manner in which a component or system such as admission valve 42 operates. Inconsistency in operation of an admission valve supplying fuel to a prechamber ignition device can lead to varying of an air to fuel ratio (AFR) within the combustion prechamber, leading to variations in the timing or manner of production of shots of combustion-initiating gases from the prechamber ignition device, and thus variations in the ignition of a main charge of fuel that the prechamber ignition device is intended to precisely control.

It has been observed that optimally reliable and predictable operation of actuator 48 and thus valve member 46 can be obtained when a magnetic force produced by energizing solenoid coil 63 dominates the movement and positioning of valve member 46 and armature 62. Magnetic force dominating the motion and/or positioning can be expected to occur where the magnetic force is sufficiently large that other potentially competing and/or confounding forces cannot overwhelm the magnetic force. A greater magnetic force can be produced with a greater amplitude of electrical current supplied to coil 56. With a greater amplitude of electrical current, however, greater heat can be produced resulting in hastened aging of electrical actuator 48, greater energy consumption and thus reduced efficiency, or causing other problems. In the interest of obtaining reliability and predictability, many state-of-the-art electrical actuators in prechamber fuel valves are overpowered. In addition to excess heat and/or hastened aging, impacts of components upon one another, such as a valve or associated hardware impacting a valve stop or valve seat, can increase the rate or extent to which components wear and/or deform, or require the use of highly robust or larger and heavier components. As further discussed herein, the present disclosure provides techniques for obtaining increased reliability and predictability without the need for overpowering electrical actuators in a fuel admission valve.

Ignition system 30 further includes a monitoring mechanism 64 configured to produce data indicative of at least one of a magnitude of a peak pressure or a timing of the peak pressure in combustion prechamber 36. Monitoring mechanism 64 may include a pressure sensor positioned directly in, or exposed to a fluid pressure of, combustion prechamber 36. As a cylinder peak pressure in cylinder 20 will also relate to a peak pressure in combustion prechamber 36, a pressure sensor for analogous purposes could alternatively be positioned within cylinder 20. In still other instances, a neural network could be employed to provide a virtual sensor producing data indicative of the magnitude of peak pressure or timing of the peak pressure in combustion prechamber 36. The magnitude of the peak pressure and/or the timing of the peak pressure are leveraged within the context of the present disclosure for adaptive, closed loop control of fuel admission valve 42, namely, electrical actuator 48, as further discussed herein.

To this end, ignition system 30 further includes an ignition control system 31 that includes a combustion consistency control mechanism 66 coupled with fuel admission valve 42 and with monitoring mechanism 64. It can be noted that combustion consistency control mechanism 66 (hereinafter "control mechanism 66") is in communication with monitoring mechanism 64, and also with electrical actuator 48 and with spark mechanism 40. Control mechanism 66 may further include a computer processor 68 and a computer readable memory 70. Computer processor 68 can include any suitable data processing device such as a microprocessor or a field programmable gate array (FPGA), and computer readable memory 70 can include any suitable computer readable memory such as random access memory (RAM), dynamic random access memory (DRAM, SDRAM), read only memory (ROM), or still others.

Control mechanism 66 can include an engine control module for engine 10, configured to perform any of a great many different control and monitoring features and functions, or could be a dedicated control mechanism specific to ignition control system 31 in other instances. Ignition control system 31 may further include an engine speed sensor 72, such as a sensor associated with crankshaft 24, and a crank angle sensor 74, associated with an engine flywheel (not shown), each of which may be of conventional and known construction and operation. In an implementation, control mechanism 66 is configured to receive the data produced by monitoring mechanism 64 that is indicative of at least one of a magnitude of a peak pressure or a timing of the peak pressure in combustion prechamber 36, and calculate an error that is based on the data indicative of at least one of a magnitude of a peak pressure or a timing of the peak pressure. Control mechanism 66 may be further configured to output a valve opening command for fuel admission valve 42 that is based on the error.

Figure 2:
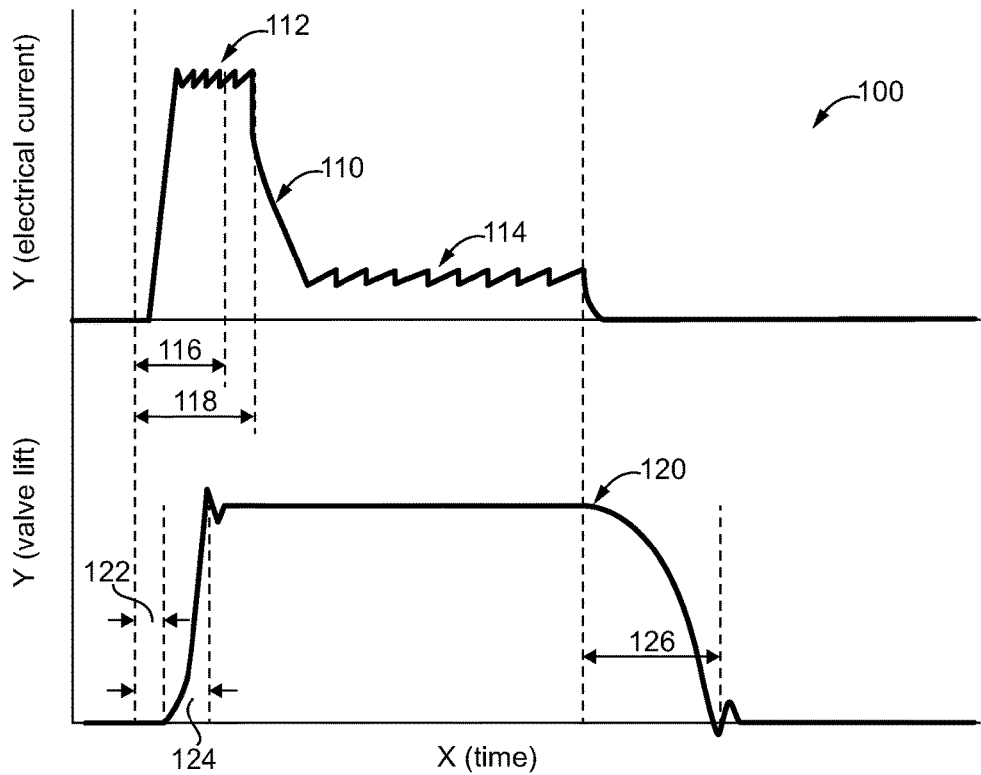
FIG. 2 is a graph including an electrical current signal and valve lift signal over time.

Referring now to FIG. 2, there is shown a graph 100 of an electrical current signal 110 and a valve lift signal 120. Signal 110 represents electrical current corresponding to the valve opening command for fuel admission valve 42. The electrical current command of signal 110 includes a peak current 112 and a hold current 114. Those skilled in the art will be familiar with the concept of an initial, higher amplitude peak current that initiates the travel of an electrically actuated component such as an electrically actuated valve. A hold current may be employed after the initial peak current to maintain the electrically actuated component at a stop position in opposition to a biasing return force. Reference numeral 116 identifies a boost time and reference numeral 118 identifies a peak time. As noted above, in certain earlier systems and strategies an initial, peak current may have been employed that was greater in amplitude than strictly needed to achieve a desired predictability and reliability. According to the present disclosure, at least one of an amplitude of the valve opening command or a duration of the valve opening command, such as a peak current amplitude, a hold current amplitude, or a peak current duration, can be varied on a basis of the error calculated by control mechanism 66. In FIG. 2, a response time 122 of admission valve 42 is shown at reference numeral 122, and an opening time is shown at reference numeral 124. Reference numeral 126 shows a closing time.

Figure 3:
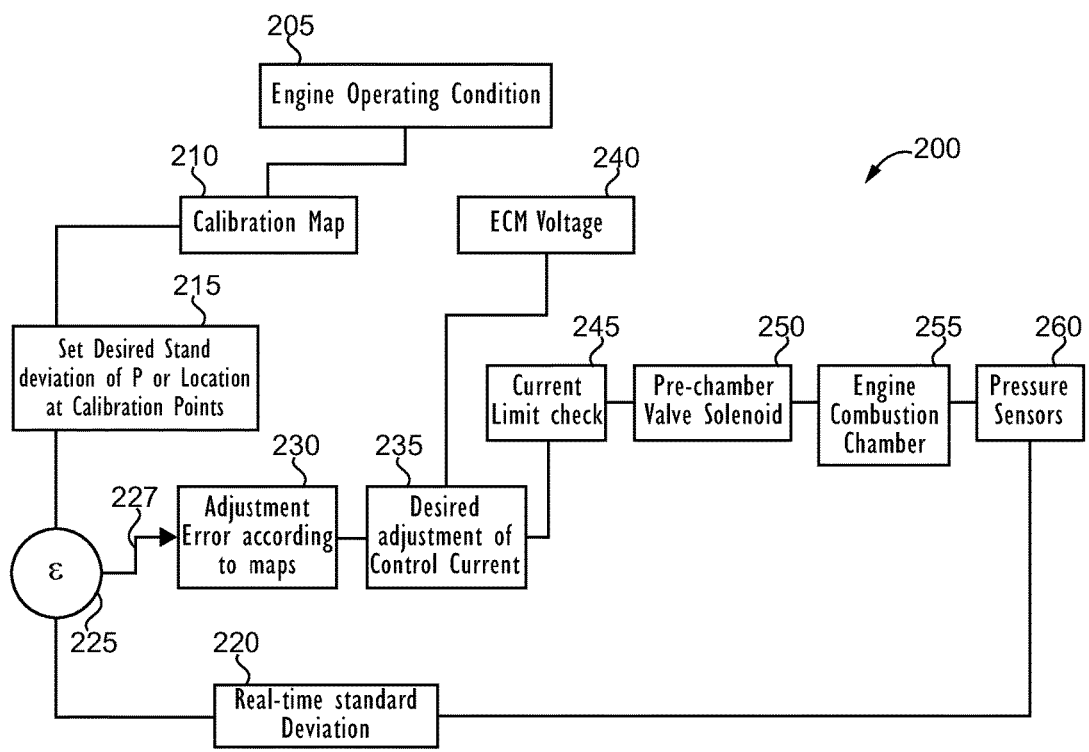
FIG. 3 is an example control loop diagram, according to one embodiment.

Referring now to FIG. 3, there is shown a control diagram 200 according to one embodiment. Engine operating condition is shown at a block 205. It will be recalled that parameters such as engine speed can be monitored by way of control mechanism 66. In an implementation, control mechanism 66 will detect engine operating conditions that indicate engine 10 is presently suitable for diagnostics and/or tuning or trimming of ignition control system 31 according to the present disclosure. Moreover, if and when tuning or trimming are to proceed, the manner in which such actions occur can vary on the basis of present engine operating conditions. A calibration map is shown at a block 210, including a map that indicates diagnostic and control parameters appropriate for a particular engine operating condition or set of engine operating conditions. It will be recalled that control mechanism 66 receives data indicative of at least one of a magnitude of a peak pressure in combustion prechamber 36 or a timing of the peak pressure in combustion prechamber 36. At a block 215 control mechanism 66 is understood to set a desired statistical dispersion value such as standard deviation of a magnitude of a peak pressure and/or a timing of the peak pressure based on the parameters from calibration map 210. The desired statistical dispersion value ("desired value") may be a value that is mapped to engine speed, for example, in calibration map 210. Accordingly, control mechanism 66 can look up the statistical dispersion value based upon present engine speed and/or potentially other factors. Higher engine speed might be associated with a higher desired value of the statistical dispersion, for example. Timing of the peak pressure may be an engine crank angle, such as might be indicated from crank angle sensor 74, at which the peak pressure occurs. Another way to understand block 215 is that statistical dispersion value(s) such as standard deviation may be associated with a magnitude of peak pressure or crank angle timing of peak pressure, for an applicable set of calibration points.

A real-time standard deviation is shown at a block 220, and an error calculation block 225 computes an error in standard deviation of magnitude of peak pressure or crank angle timing of peak pressure to produce an error signal 227. The error calculation can include comparing the standard deviation or other statistical dispersion value with the desired value, and calculating the error based on the comparison. At a block 230 an adjustment error is calculated according to stored adjustment error maps. The relative extent to which standard deviation or another statistical dispersion value deviates from a desired value, in other words the size of the error, can affect the extent to which an adjustment in the valve opening command from cycle to cycle is needed. At a block 235 a desired adjustment of control current, or another valve opening command, is determined, based upon the adjustment error calculation and also upon an ECM voltage input at block 240. At a block 245 a current limit check is performed to ensure the control current is not at or above a predefined threshold, for example. The prechamber valve solenoid, the engine combustion chamber, and pressure sensors are shown at a block 250, a block 255, and a block 260, respectively. Data produced by pressure sensors at block 260 is used in the calculation of real-time standard deviation at block 220. From FIG. 3 it will be understood that control mechanism 66 can adjust properties of the valve opening command in a closed loop fashion. Accordingly, prechamber ignition device 32 can produce a first shot of combustion-initiating gases, the peak pressure magnitude and/or timing can be observed, standard deviation and error calculated, and then a valve opening command determined to produce a second shot of combustion-initiating gases from prechamber ignition device 32. Producing the first shot of combustion-initiating gases and producing the second shot of combustion-initiating gases can each include spark-igniting a mixture of air and a gaseous fuel admitted into the prechamber by way of fuel admission valve 42. Those skilled in the art will further appreciate that control mechanism 66 could seek out or continuously monitor for suitable engine operating conditions at which the calculations and control set forth in FIG. 3 can be carried out, and the updated valve control commands used for producing many shots of combustion-initiating gases going forward until such time as diagnostics and tuning or trimming are again appropriate and available.

INDUSTRIAL APPLICABILITY

Figure 4:
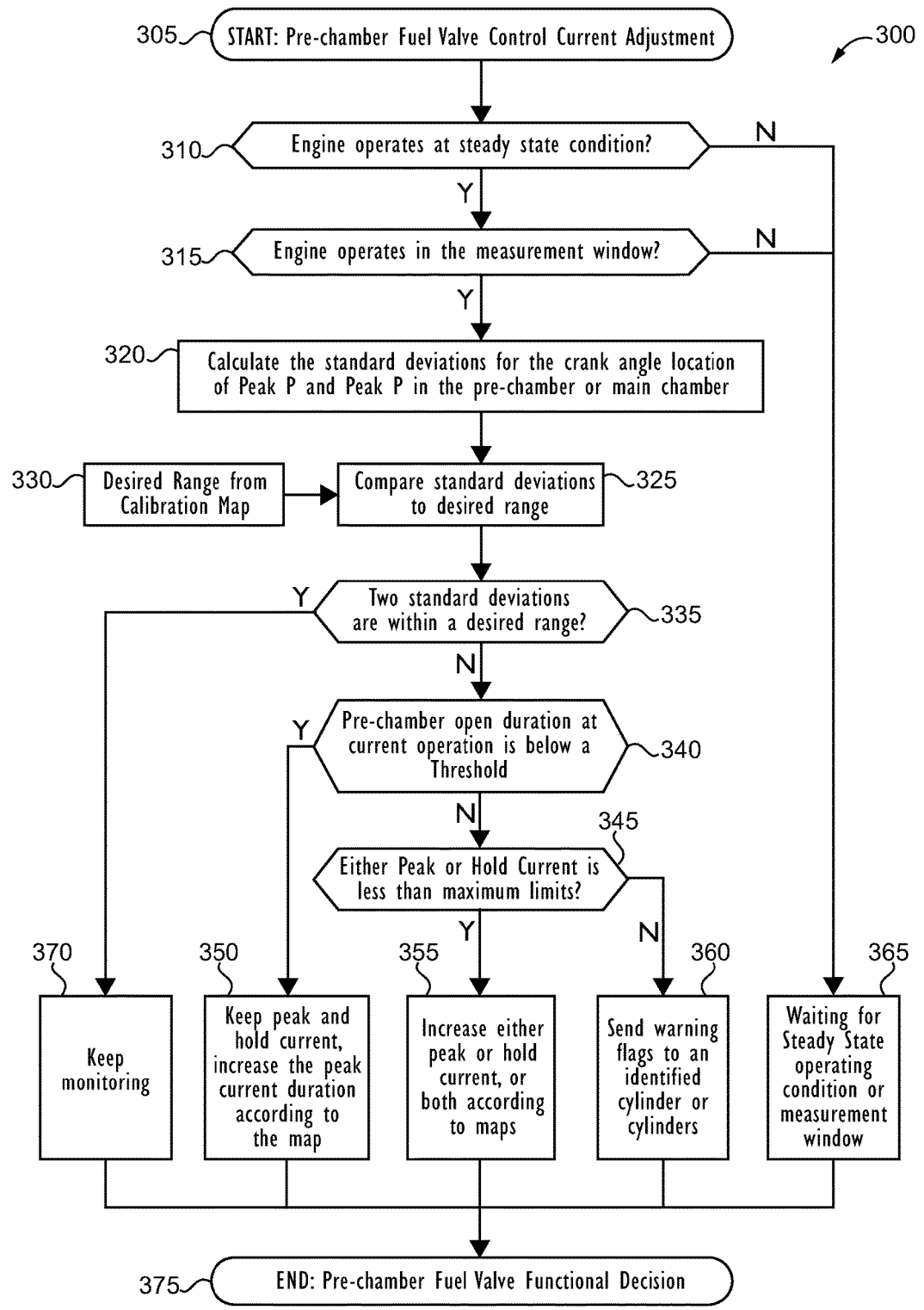
FIG. 4 is a flowchart illustrating example process and control logic flow, according to one embodiment.

Referring now to FIG. 4, there is shown a flowchart 300 according to an embodiment, and setting forth example process and control logic flow. Control mechanism 66 may execute the steps of flowchart 300, and could do so independently or in conjunction with one or more other computer control devices. At a block 305, the logic Starts or initializes. From block 305 the logic can advance to block 310 to query does the engine operate at a steady state condition? The determination of whether the engine is operating at steady state could include determining whether engine speed and engine load are constant or at least relatively so. If no, the logic can advance to block 365 to wait for steady state operating conditions or a measurement window. The measurement window could include the existence of steady state conditions and/or satisfaction of criteria relating to engine speed, engine load, engine fueling, exhaust temperatures, or other criteria. If yes, the logic can advance from block 310 to block 315 to query does the engine operate in the measurement window? If no, the logic can advance to block 365. If yes, the logic can advance to block 320 to calculate the standard deviations for the crank angle location of peak pressure and magnitude of peak pressure in prechamber 36 or main chamber/cylinder 20. Calculation of the standard deviation(s) could include, for example, receiving data of the parameters of interest over a predefined number of engine cycles, or a number of engine cycles or other conditions such as elapsed time that otherwise provides sufficiently reliable data. Control mechanism 66 might store peak pressure values for six engine cycles, eight engine cycles, or fifty or more engine cycles, for instance, and calculate the standard deviation for the peak pressure based on the stored peak pressure values. Control mechanism 66 could analogously store the crank angle locations that correspond to the timing of the occurrence of the peak pressure values for the same number of engine cycles or the same elapsed time, or potentially even a different number of engine cycles or different elapsed time.

In an embodiment both of peak pressure and crank angle location of the peak pressure will be used, although the present disclosure is not thereby limited.

From block 320 the logic can advance to block 325 to compare standard deviations to a desired range (or desired value). Desired ranges are provided from a calibration map at block 330. From block 325 the logic can advance to block 335 to query are the two standard deviations within a desired range? If both standard deviations are within the desired range, the logic can advance to block 370 to keep monitoring. If any one of the two standard deviations are not within the desired range, the logic can advance to block 340 to query is the prechamber admission valve open duration at current operation below a threshold? The prechamber valve open duration includes a time duration that the prechamber valve is open, and could be determined by reading a stored valve open duration mapped to present peak current duration, for example. If yes, the logic can advance to block 350 to keep peak and hold current steady and increase the peak current duration according to a map. In an implementation, the relative extent of increase in the peak current duration can vary on the basis of the error between the standard deviation that is observed and a desired value of the standard deviation. In other words, the error calculation can include calculating a difference between the standard deviation or other statistical dispersion value and the desired value. For instance, where the desired range or value of the standard deviation for magnitude of peak pressure is "1," and the real-time standard deviation is "3," then an error in the standard deviation of "2" is calculated. Valve control command adjustment might then be based on an error value of 2. Different error values would typically be mapped to different peak current durations or changes in peak current duration. Analogously, different error values can be mapped to different peak current or hold current amplitudes or changes in amplitude that are acted upon elsewhere in the process of flowchart 300, as further discussed below.

If at block 340 the prechamber admission valve open duration is not below the threshold, rather than selecting increased peak current duration from among the possible increased peak current amplitude, increased hold current amplitude, or increased peak current duration on the basis of the expected open duration of fuel admission valve 42, control mechanism 66 can select an increased peak current amplitude, or an increased hold current amplitude. At a block 345 control mechanism 66 can query, is either peak or hold current less than a maximum limit? The maximum limit(s) might be based on peak current or hold current durations or amplitudes considered to create a risk of damaging the valve solenoid, such as by overheating. If yes, the logic can advance to block 355 to increase either peak current amplitude or hold current amplitude, or both, according to maps that relate the peak current amplitude or the hold current amplitude to the calculated error. Peak current amplitude and hold current amplitude, or relative change in peak current amplitude and hold current amplitude, can be positively correlated with error value or error size. If at block 345 neither of peak or hold current is less than the maximum limit, the logic can advance to block 360 to send warning flags to an identified cylinder or cylinders. The logic can advance from any of blocks 350, 355, 360, 365, or 370 to End at a block 375 that terminates the prechamber valve functional decision.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An ignition system for an internal combustion engine comprising:
    a prechamber ignition device defining a combustion prechamber;
    a fuel admission valve adjustable from a closed state to an open state to admit fuel into the combustion prechamber, for producing a shot of combustion-initiating gases from the prechamber ignition device;
    a monitoring mechanism configured to produce data indicative of a peak pressure in the combustion prechamber;
    a combustion consistency control mechanism coupled with the fuel admission valve and with the monitoring mechanism, the combustion consistency control mechanism being configured to:
        output a first valve opening command for the fuel admission valve that produces a first shot of combustion-initiating gases from the prechamber ignition device in a first engine cycle;
        calculate an error that is based on the data indicative of the peak pressure;
        output a second valve opening command for the fuel admission valve that produces a second shot of combustion-initiating gases from the prechamber ignition device in a second engine cycle; and
        the second valve opening command being based on the error and having at least one of an amplitude or a duration that differs from an amplitude or a duration, respectively, of the first valve opening command.

2. The ignition system of claim 1 wherein the second valve opening command includes an electrical current command.

3. The ignition system of claim 2 wherein the electrical current command includes a peak current and a hold current, and wherein the at least one of an amplitude or a duration of the second valve opening command includes a peak current amplitude, a hold current amplitude, or a peak current duration.

4. The ignition system of claim 3 wherein the combustion consistency control mechanism is further configured to:
    compare the error with a threshold error; and
    determine, based on the comparing of the error with the threshold error, at least one of an increased peak current duration, an increased peak current amplitude, or an increased hold current amplitude.

5. The ignition system of claim 4 wherein the combustion consistency control mechanism is further configured to select, based on an expected open duration of the fuel admission valve, the at least one of the increased peak current duration, the increased peak current amplitude, or the increased peak current duration.

6. The ignition system of claim 1 wherein the combustion consistency control mechanism is further configured to:
    receive the data indicative of the peak pressure in each of a plurality of engine cycles; and
    calculate the error based on the data indicative of the peak pressure in each of the plurality of engine cycles.

7. The ignition system of claim 1 wherein the combustion consistency control mechanism is further configured to:
    calculate a statistical dispersion value that is based on the data indicative of the peak pressure in each of a plurality of engine cycles; and
    calculate the error based on a difference between the statistical dispersion value and a desired value.

8. The ignition system of claim 7 wherein the statistical dispersion value includes a standard deviation.

9. A method of reducing shot-to-shot variation among shots of combustion-initiating gases from a prechamber ignition device in an internal combustion engine, the method comprising:
    producing a first shot of combustion-initiating gases from the prechamber ignition device into a cylinder in the internal combustion engine;
    receiving data indicative of a peak pressure in a combustion prechamber of the prechamber ignition device, the peak pressure resulting from the production of the first shot of combustion-initiating gases;
    calculating an error based on the data indicative of the peak pressure;
    outputting a valve opening command for a fuel admission valve coupled with the prechamber ignition device that is based on the error; and
    producing a second shot of combustion-initiating gases from the prechamber ignition device into the cylinder in the internal combustion engine responsive to the valve opening command.

10. The method of claim 9 wherein the calculating of an error further includes calculating a statistical dispersion value based on the data indicative of the peak pressure, and calculating the error based on a difference between the statistical dispersion value and a desired value.

11. The method of claim 10 wherein the statistical dispersion value includes a standard deviation.

12. The method of claim 10 wherein the outputting of the valve opening command further includes outputting an electrical current command.

13. The method of claim 10 wherein the electrical current command includes a peak current and a hold current, and further comprising determining at least one of a peak current amplitude, a hold current amplitude, or a peak current duration, based on the error.

14. The method of claim 13 further comprising selecting among the at least one of the peak current amplitude, the hold current amplitude, or the peak current duration, based upon a valve open time of the fuel admission valve.

15. The method of claim 9 wherein the producing of the first shot of combustion-initiating gases and the producing of the second shot of combustion-initiating gases each include spark-igniting a mixture of air and a gaseous fuel admitted into the prechamber by way of the fuel admission valve.

16. An ignition control system for an internal combustion engine comprising:
    a monitoring mechanism configured to produce data indicative of a peak pressure in a combustion prechamber of a prechamber ignition device;
    a combustion consistency control mechanism coupled with the monitoring mechanism, the combustion consistency control mechanism being configured to:
        output a first valve opening command for the fuel admission valve that produces a first shot of combustion-initiating gases from the prechamber ignition device in a first engine cycle;

receive the data indicative of the peak pressure;

calculate an error based on the data indicative of the peak pressure; and output a second valve opening command to a fuel admission valve coupled with the prechamber ignition device such that the prechamber ignition device produces a second shot of combustion-initiating gases in a second engine cycle;

the valve opening command being based on the error and having at least one of an amplitude or a duration that differs from an amplitude or a duration, respectively, of the first valve opening command.

17. The ignition control system of claim 16 wherein the combustion consistency control mechanism is further configured to:

compare a standard deviation of the peak pressure with a desired value; and calculate the error based on the comparing of the standard deviation with a desired value.

18. The ignition control system of claim 16 wherein the second valve opening command includes an electrical current command, and wherein the combustion consistency control mechanism is further configured to determine, based on the error, at least one of an amplitude of the electrical current command or a duration of the electrical current command.

19. The ignition control system of claim 18 wherein the electrical current command includes a peak current and a hold current, and the amplitude includes a peak current amplitude or a hold current amplitude, and the duration includes a peak current duration.

20. The ignition system of claim 1 wherein the data indicative of the peak pressure is at least one of a magnitude of the peak pressure in the combustion prechamber or a timing of the peak pressure in the combustion prechamber.

21. The method of claim 9 wherein the data indicative of the peak pressure is at least one of a magnitude of the peak pressure in the combustion prechamber or a timing of the peak pressure in the combustion prechamber.

22. The ignition control system of claim 18 wherein the data indicative of the peak pressure is at least one of a magnitude of the peak pressure in the combustion prechamber or a timing of the peak pressure in the combustion prechamber.

* * * * *